(12) United States Patent
Mikazuki et al.

(10) Patent No.: US 12,162,341 B2
(45) Date of Patent: Dec. 10, 2024

(54) UNDER BODY STRUCTURE OF AUTOMOBILE

(71) Applicant: NIPPON STEEL CORPORATION, Tokyo (JP)

(72) Inventors: Yutaka Mikazuki, Tokyo (JP); Yasunori Ito, Tokyo (JP)

(73) Assignee: NIPPON STEEL CORPORATION, Tokyo (JP)

( * ) Notice: Subject to any disclaimer, the term of this patent is extended or adjusted under 35 U.S.C. 154(b) by 233 days.

(21) Appl. No.: 17/765,284

(22) PCT Filed: Oct. 2, 2020

(86) PCT No.: PCT/JP2020/037658
§ 371 (c)(1),
(2) Date: Mar. 30, 2022

(87) PCT Pub. No.: WO2021/066180
PCT Pub. Date: Apr. 8, 2021

(65) Prior Publication Data
US 2022/0363122 A1 Nov. 17, 2022

(30) Foreign Application Priority Data

Oct. 3, 2019 (JP) .................. 2019-183315

(51) Int. Cl.
*B60K 1/04* (2019.01)
*B60K 11/02* (2006.01)
(Continued)

(52) U.S. Cl.
CPC ................ *B60K 1/04* (2013.01); *B60K 11/02* (2013.01); *B62D 25/025* (2013.01);
(Continued)

(58) Field of Classification Search
CPC .... B60K 1/04; B60K 11/02; B60K 2001/005; B60K 2001/0438; B62D 25/025; B62D 25/2036
See application file for complete search history.

(56) References Cited

U.S. PATENT DOCUMENTS 7,610,978 B2 * 11/2009 Takasaki ................ B62D 25/20
429/96
9,027,684 B2 * 5/2015 Araki ...................... B60K 1/04
180/311
(Continued)

FOREIGN PATENT DOCUMENTS

CN 207565708 U 7/2018
CN 109204529 A 1/2019
(Continued)

*Primary Examiner* — John D Walters
(74) *Attorney, Agent, or Firm* — Birch, Stewart, Kolasch & Birch, LLP

(57) ABSTRACT

An under body structure of an automobile enabling batteries to be mounted on an automobile by a simple configuration and efficiently transferring load at the time of a collision, that is, an under body structure 100 of an automobile provided with a body floor 110 forming a floor part of the automobile and batteries 50 (battery cells or battery modules) directly suspended from and fastened to a bottom side of the body floor 110.

7 Claims, 12 Drawing Sheets

(51) Int. Cl.
*B62D 25/02* (2006.01)
*B62D 25/20* (2006.01)
*B60K 1/00* (2006.01)

(52) U.S. Cl.
CPC .... *B62D 25/2036* (2013.01); *B60K 2001/005* (2013.01); *B60K 2001/0438* (2013.01)

(56) References Cited

U.S. PATENT DOCUMENTS

| | | | |
|---|---|---|---|
| 9,722,287 B2 * | 8/2017 | Kim | H01M 10/613 |
| 9,919,591 B2 | 3/2018 | Mizoguchi et al. | |
| 10,207,573 B2 * | 2/2019 | Hara | H01M 50/264 |
| 10,603,998 B2 * | 3/2020 | Toyota | B60L 50/66 |
| 10,882,557 B2 * | 1/2021 | Otoguro | B60K 1/04 |
| 11,145,927 B2 * | 10/2021 | Haeusler | B60L 50/66 |
| 2009/0152034 A1 | 6/2009 | Takasaki et al. | |
| 2012/0055725 A1 | 3/2012 | Mizoguchi et al. | |
| 2014/0291046 A1 | 10/2014 | Araki | |
| 2014/0338999 A1 | 11/2014 | Fujii et al. | |
| 2016/0149277 A1 | 5/2016 | Kim et al. | |
| 2017/0305249 A1 | 10/2017 | Hara | |
| 2019/0009662 A1 | 1/2019 | Toyota | |
| 2019/0074497 A1 | 3/2019 | Haeusler et al. | |
| 2019/0276080 A1 | 9/2019 | Otoguro | |

FOREIGN PATENT DOCUMENTS

| | | |
|---|---|---|
| DE | 10.2011 113 238 A1 | 4/2012 |
| JP | 11-176487 A | 7/1999 |
| JP | 2000-344026 A | 12/2000 |
| JP | 2009-143446 A | 7/2009 |
| JP | 2012-66773 A | 4/2012 |
| JP | 2013-60160 A | 4/2013 |
| JP | 5411235 B2 | 2/2014 |
| JP | 2014-201277 A | 10/2014 |
| JP | 6122807 B2 | 4/2017 |
| JP | 2017-193288 A | 10/2017 |
| JP | 2017-196958 A | 11/2017 |
| JP | 2017-196959 A | 11/2017 |
| JP | 2017-226353 A | 12/2017 |
| JP | 2019-14349 A | 1/2019 |
| JP | 2019-156029 A | 9/2019 |
| KR | 10-2012-0015446 A | 2/2012 |
| WO | WO2013/084935 A1 | 6/2013 |

* cited by examiner

UNDER BODY STRUCTURE OF AUTOMOBILE

FIELD

The present invention relates to an under body structure of an automobile.

BACKGROUND

It has been known in the past to house batteries which are equipped with an electric vehicle etc. in a battery box or other container and attach this container to a body (for example, see PTLs 1 to 6).

CITATIONS LIST

Patent Literature

PLT 1: Japanese Unexamined Patent Publication No. 2017-226353
PLT 2: Japanese Unexamined Patent Publication No. 2019-14349
PLT 3: Japanese Unexamined Patent Publication No. 2019-156029
PLT 4: Japanese Patent No. 6122807
PLT 5: Japanese Patent No. 5411235
PLT 6: Japanese Unexamined Patent Publication No. 2013-060160

SUMMARY

Technical Problem

Batteries are high in specific gravity and relatively heavy, so if an automobile with which batteries are equipped is involved in a collision, a large load will act on the batteries. If the batteries receiving the load deform, the batteries may catch fire or the batteries may leak current. For this reason, it housing batteries in a battery box or other container and attaching it to the body, the container has to have a structurally high rigidity. This is because if the container is low in rigidity, the container may be destroyed at the time of the collision and the batteries may deform and, further, the container housing the batteries may detach from the body.

The above PTLs 1 to 6 disclose battery boxes for automobiles having a high rigidity for improving the impact resistance. For example, the battery pack described in PTL 1 is provided with battery cross members, longitudinal struts, and other high rigidity members. The battery pack described in PTL 2 is provided with high rigidity side wall parts, front wall part, and rear wall part comprised of extruded parts. The battery pack described in PTL 3 is provided with a pack inside cross as a high rigidity frame part for protecting the battery pack. The battery frame described in PTL 4 is provided with a high rigidity second cross member below the ICU. The battery pack described in PTL 5 is provided with high rigidity first to fourth cross members. Further, the battery pack described in PTL 6 is provided with sub cross members at a battery frame.

However, if giving the battery box or other container housing the batteries a high rigidity, there is the problem that the structure of the container becomes complicated or the weight of the container increases.

Therefore, the present invention has as its object the provision of an under body structure of an automobile enabling batteries to be mounted on an automobile by a simple configuration and able to efficiently transfer a load at the time of a collision.

Solution to Problem

The gist of the present disclosure is as follows:
(1) An under body structure of an automobile comprising a body floor forming a floor part of the automobile and battery cells or battery modules directly suspended from and fastened to a bottom side of the body floor.
(2) The under body structure of an automobile according to the above (1), wherein the battery cells or the battery modules are fastened to the body floor in a state with top surface of the battery cells or the battery modules abutting against a bottom surface of the body floor.
(3) The under body structure of an automobile according to the above (1), further comprising cooling panels in which a coolant circulates, the battery cells or the battery modules being fastened to the body floor with the cooling panels interposed between the battery cells or the battery modules and the body floor.
(4) The under body structure of an automobile according to the above (3), wherein top surfaces of the battery cells or the battery modules abut against bottom surfaces of the cooling panels.
(5) The under body structure of an automobile according to any one of the above (1) to (4), wherein the body floor has a floor panel forming a floor surface of the automobile, and the battery cells or the battery modules are fastened to the floor panel.
(6) The under body structure of an automobile according to the above (5), wherein the body floor has cross members arranged on the floor panel and extending in a left-right direction of the automobile, and the battery cells or the battery modules are fastened to the floor panel or the cross members.
(7) The under body structure of an automobile according to the above (5) or (6), wherein the body floor has side sills extending in a front-rear direction of the automobile at outermost parts in a left-right direction of the automobile, the floor panel is provided between left and right side sills, and the battery cells or the battery modules are arranged over the entire area of the floor panel including regions adjoining the side sills.

Advantageous Effects of Invention

According to the present invention, the effect is exhibited that it is possible to provide an under body structure of an automobile enabling batteries to be mounted on an automobile by a simple configuration and able to efficiently transfer a load at the time of a collision.

DESCRIPTION OF EMBODIMENTS

First, the configuration of an under body structure of an automobile according to one embodiment of the present invention will be explained referring to FIG. 1 to FIG. 5. The under body structure 100 of an automobile according to the present embodiment relates to an under body structure of an electric vehicle or other automobile mounting batteries. The under body structure has a structure where battery cells or battery modules of an automobile are directly fastened to members forming the body floor of the automobile.

Figure 1:
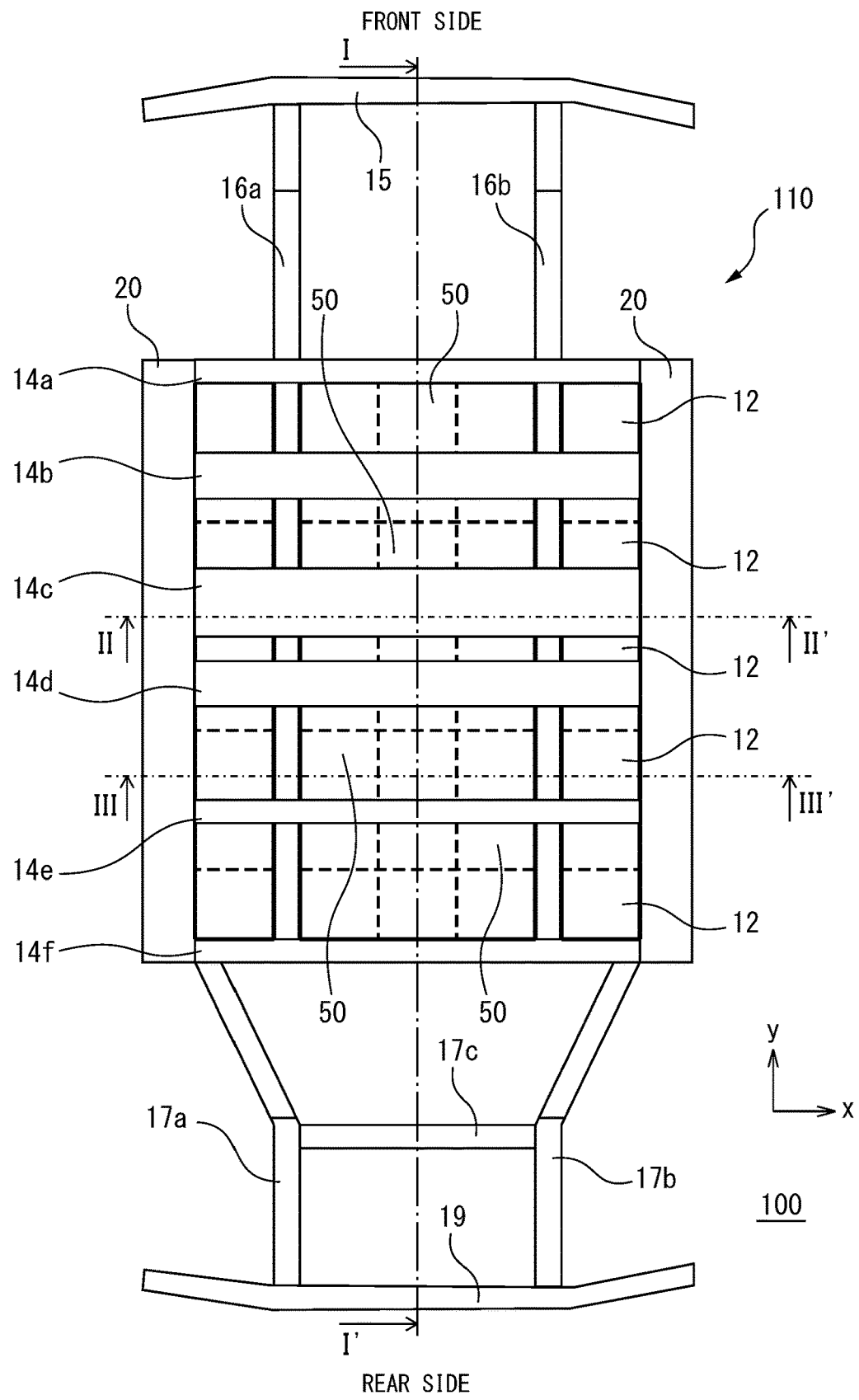
FIG. 1 is a schematic view for explaining an under body structure of an automobile according to the present embodiment and a plan view of an under body structure of an automobile seen from above.
Figure 2:
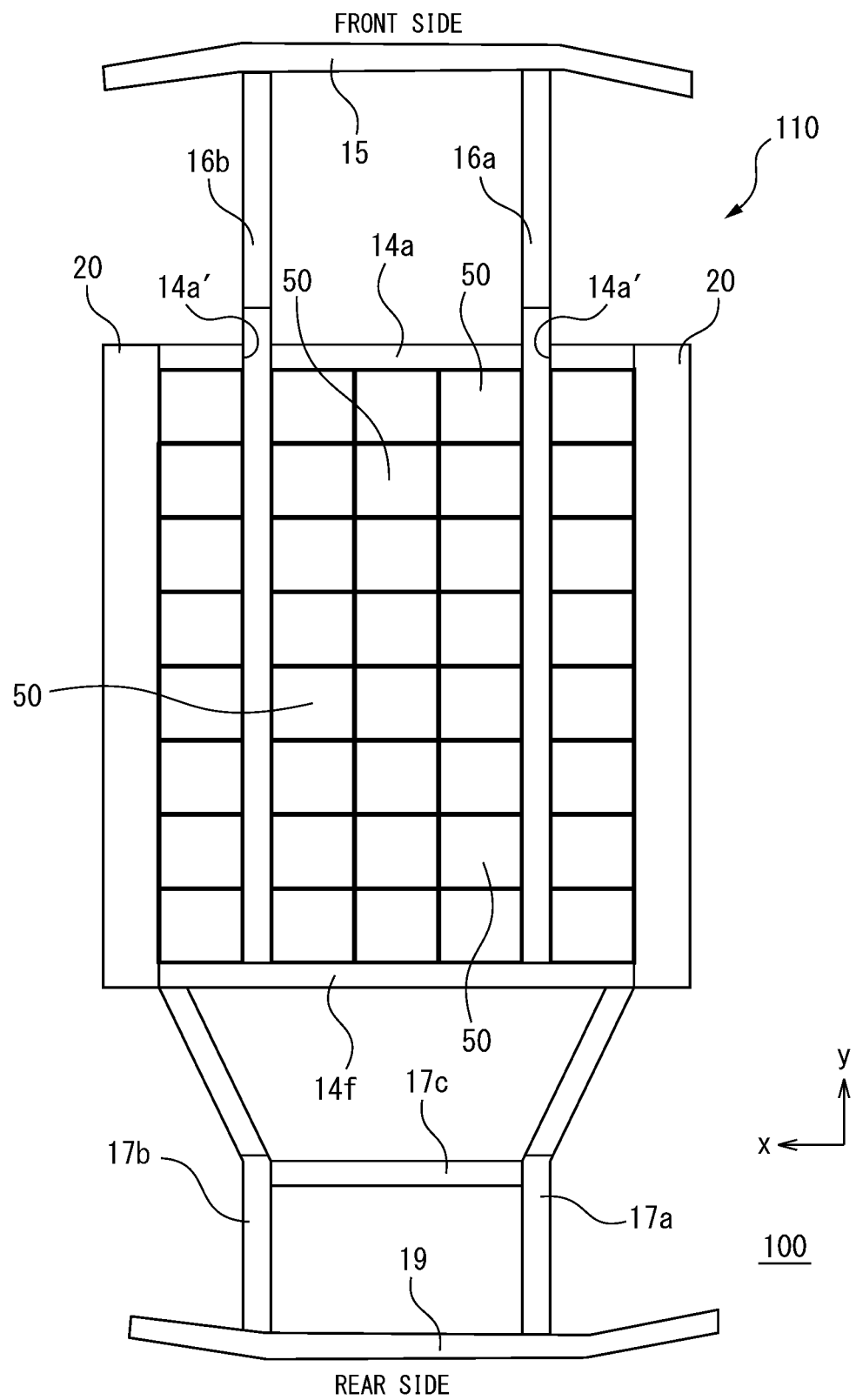
FIG. 2 is a view of an under body structure of an automobile seen from below.
Figure 3:
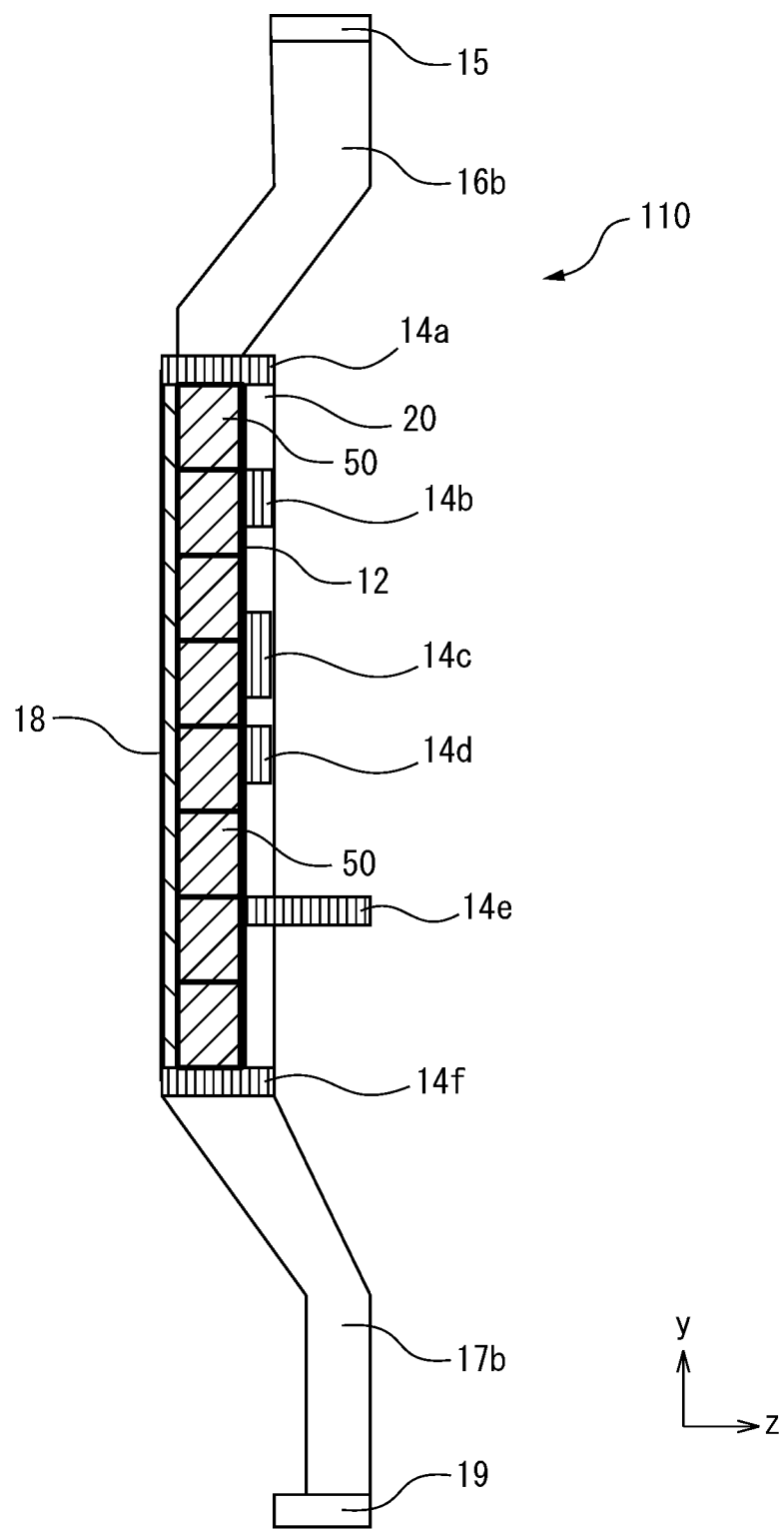
FIG. 3 is a schematic view showing a cross-section along a one-dot chain line I-I' of FIG. 1.

FIG. 1 is a schematic view for explaining an under body structure 100 of an automobile according to the present embodiment and a plan view of the under body structure 100 of an automobile seen from above. FIG. 2 is a view of the under body structure 100 of an automobile seen from below. FIG. 3 is a schematic view showing a cross-section along a one-dot chain line I-I' of FIG. 1. Note that, in FIG. 2, illustration of an under cover 18 is omitted.

First, a basic structure of a body floor 110 in the under body structure 100 of an automobile will be explained. As shown in FIG. 1, the body floor 110 has a floor panel 12, floor cross members 14a to 14f, a front bumper beam 15, front side members 16a and 16b, rear side members 17a and 17b, an under cover 18, a rear bumper beam 19, and side sills 20.

The side sills 20 extend along the left and right side surfaces of the automobile in a front-rear direction of the automobile (vehicle length direction, y-axial direction shown in figure). The floor cross members 14a to 14f extend in a left-right direction of the automobile (vehicle width direction, x-axial direction shown in figure). Note that, the z-axial direction shown in the figure is a direction perpendicular to both the x-axis and the y-axis and shows a height direction of the automobile (vehicle height direction). The floor cross members 14a to 14f are respectively joined at their two end parts with the left and right side sills 20 by welding, riveting, bolting, etc. (below, referred to as "welding etc.")

Among the floor cross members 14a to 14f, the floor cross member 14a positioned at the frontmost side and the floor cross member 14f positioned at the rearmost side have equal thicknesses as the side sills 20 in the top-bottom direction.

The floor cross members 14b to 14e are arranged extending in the vehicle width direction in the region surrounded by the left and right side sills 20, floor cross member 14a, and floor cross member 14f. As shown in FIG. 3, the top surfaces of the floor cross members 14a and 14f, floor cross members 14b to 14d, and side sills 20 are arranged at substantially the same positions. The bottom surfaces of the floor cross members 14b to 14e are arranged at the same positions in the top-bottom direction and are positioned above the bottom surfaces of the floor cross members 14a and 14f and the side sills 20.

Under the floor cross members 14b to 14e, the floor panel 12 is arranged. The floor panel 12 is fastened to the floor cross members 14a to 14f and side sills 20 by welding etc.

The floor cross members 14a to 14f may all be configured from hat-shaped materials (cross-sectional hat-shaped members) and the flanges of the hat-shaped materials may be joined with the floor panel 12. Further, the floor cross members 14a to 14f may be configured from hollow pipe-shaped members and may have rectangular cross-sections perpendicular to the longitudinal directions.

At the inside from the side sills 20 in the vehicle width direction, two front side members 16a and 16b extend in the vehicle length direction. As shown in FIG. 2, the end parts of the front side members 16a and 16b at the rear sides abut against the floor cross members 14f and may be fastened to the floor cross member 14f by welding etc.

As shown in FIG. 3, the position of the bottom surface of the front side member 16b in the top-bottom direction may match the position of the bottom surfaces of the floor cross members 14a and 14f or may be above the bottom surfaces by exactly the thickness of the under cover 18. Further, the position of the bottom surface of the front side member 16b in the top-bottom direction may match the position of the bottom surfaces of the side sills 20 or may be above the bottom surfaces by exactly the thickness of the under cover 18. Note that, the position of the bottom surface of the front side member 16a in the top-bottom direction may also match the position of the bottom surface of the front side member 16b.

The top surfaces of the front side members 16a and 16b may abut against the floor panel 12 and may be fastened to the floor panel 12 by welding etc.

As shown in FIG. 2, at the positions where the front side members 16a and 16b and the floor cross member 14a cross, the floor cross member 14a may be provided with groove-shaped retracted parts 14a'. At the positions where the front side members 16a and 16b and the floor cross member 14a cross, the front side members 16a and 16b may be inserted into these retracted parts 14a' and may be joined to the floor cross members 14a by welding etc. The front bumper beam 15 may be fastened to the end parts of the front side members 16a and 16b at the front sides.

At the rear side of the floor cross member 14f, two rear side members 17a and 17b extend in the vehicle length direction. The end parts of the rear side members 17a and 17b at the front sides may also be fastened by welding etc. to the floor cross member 14f. The rear bumper beam 19 may be fastened to end parts of the rear side members 17a and 17b at the rear sides. Further, in the middle of the front-rear direction of the rear side members 17a and 17b, a cross member 17c connecting the rear side member 17a and the rear side member 17b may be arranged. The end parts of the cross member 17c may be fastened by welding etc. to the rear side member 17a and the rear side member 17b respectively.

Figure 4:
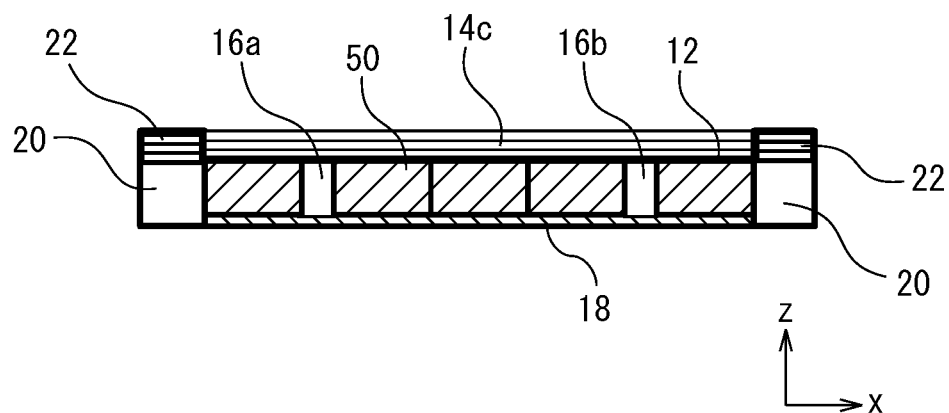
FIG. 4 is a schematic view showing a cross-section along a one-dot chain line II-IF of FIG. 1.

FIG. 4 is a schematic view showing a cross-section along a one-dot chain line II-IF of FIG. 1. As shown in FIG. 4, the floor panel 12 is arranged below the floor cross member 14c, and front side members 16a and 16b are arranged below the floor panel 12. The front side members 16a and 16b are joined to the floor panel 12 by welding etc.

As shown in FIG. 4, the side sills 20 are made structures with hollow cross-sections perpendicular to their longitudinal directions. Inside the side sills 20, energy absorbing members 22 are arranged so as to correspond to the positions of the floor cross members 14a to 14f in the top-bottom direction. The energy absorbing members 22 are, for example, comprised of aluminum extruded materials or steel structures etc. When the energy absorbing members 22 are aluminum extruded materials, the extrusion directions may be made directions matching the longitudinal directions of the floor cross members 14a to 14f.

Figure 5:
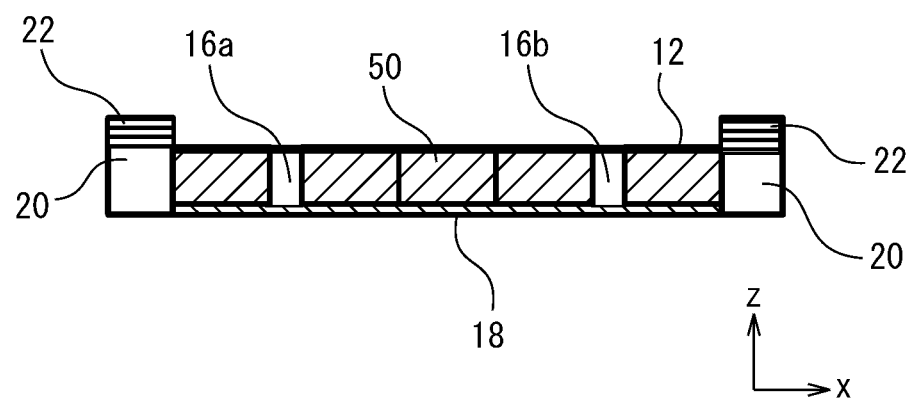
FIG. 5 is a schematic view showing a cross-section along a one-dot chain line of FIG. 1.

FIG. 5 is a schematic view showing a cross-section along a one-dot chain line of FIG. 1. The structure of the cross-section shown in FIG. 5 is similar to that of FIG. 4 except that there is no floor cross member 14c present.

As shown in FIG. 4 and FIG. 5, the region inside the side sills 20 at the bottom side of the floor panel 12 is the region at which the batteries 50 is mounted. The under cover 18 covers the bottom side of the battery 50 and is fastened to the bottom surfaces of the front side members 16a and 16b or the bottom surfaces of the side sills 20.

In the above way, the side sills 20, floor cross members 14a to 14f, front side members 16a and 16b, and floor panel 12 configure the basic structure of the body floor 110. Further, this basic structure may have the rear side members 17a and 17b, front bumper beam 15, under cover 18, rear bumper beam 19, etc. attached to it.

Next, the structure whereby batteries 50 of the automobile are packed at the bottom part of the body floor 110 in the under body structure 100 of an automobile according to the present embodiment will be explained. The batteries 50 are attached to the bottom side of the body floor 110 and suspended from the body floor 110.

First, the batteries 50 according to the present embodiment will be explained. The batteries 50 according to the present embodiment are battery cells or battery modules. A battery pack for an automobile housing a plurality of battery modules and having collision resistance is not included in the "batteries 50" in the present embodiment. Note that a battery pack is sometimes also called a "battery box", "battery case", "IPU case", "battery housing", etc., but all of these have structures having collision resistance.

A "battery cell" is a unit cell formed by a common electrolyte provided in a single case, while a "battery module" is a plurality of battery cells bundled together. Note that, as the electrolyte included in a battery cell, a liquid or a solid one is used.

If explaining in detail the difference between a battery module and a battery pack, a battery pack is, for example, provided with a structure (frame etc.) for increasing the rigidity or parts for increasing the rigidity for the purpose of improving the collision resistance. On the other hand, a battery module is not provided with a structure for increasing the rigidity or parts for increasing the rigidity. Note that, a battery module sometimes has frame-shaped parts connecting the plurality of battery cells, but these parts are for connecting the plurality of battery cells and are not for increasing the rigidity of the battery module itself.

Further, a battery pack seals the inside battery module by its box structure. The inside of a battery pack has airtightness. On the other hand, a battery module does not have a structure sealing the battery cells and parts of the battery cells are sometimes exposed to the outside.

Furthermore, a battery pack is equipped with a battery ECU (electronic control unit) for controlling charging and discharging, but a battery module is not equipped with a battery ECU.

The batteries 50 according to the present embodiment are not provided with a structure or parts increasing the rigidity like a battery pack. Further, if the batteries 50 are battery modules, the battery modules do not have a structure sealing the battery cells and are not equipped with a battery ECU. For this reason, the batteries 50 according to the present embodiment do not correspond to a so-called battery pack.

The above such difference is due to the fact that a battery pack for a vehicle is configured considering collision resistance and is configured considering replacement and other maintenance ability. On the other hand, the batteries 50 according to the present embodiment as explained later consolidate the load paths at the time of a collision into a single system and efficiently transfer the load at the time of a collision, so are not provided with high rigidity members like a battery pack.

As shown in FIG. 2, a plurality of batteries 50 are arranged to the body floor 110. The batteries 50 may be arranged packed over substantially the entire surface of a region surrounded by the left and right side sills 20, floor cross member 14a, and floor cross member 14f except for the regions where the front side members 16a and 16b are arranged.

As shown in FIG. 3 to FIG. 5, the batteries 50 abut against the bottom surface of the floor panel 12 at their top surfaces and are fastened to the floor panel 12. On the other hand, as shown in FIG. 4, at positions corresponding to the floor cross members 14a to 14f in the front-rear direction, the batteries 50 may also be fastened to the floor cross members 14a to 14f. As the method of fastening these, if there is a need for replacement and maintenance of the batteries, bolting, thumb-turn clamping, fitted conclusion, and other detachable fastening mechanisms can be used. If there is almost no need for replacement and maintenance of the batteries, riveting, welding, bonding, etc. can be used.

In an electric vehicle or other automobile, to extend the cruising range, it is desirable to be able to mount a greater number of batteries 50. In the present embodiment, at the bottom side of the body floor 110, batteries 50 are packed over the entire surface of the floor panel 12, so a greater number of batteries 50 can be mounted. In particular, at the outsides from the front side members 16a and 16b, batteries 50 are mounted between the front side members 16a and 16b and the side sills 20 as well. Therefore, the number of batteries 50 mounted can be increased and the travel distance of the automobile can be extended.

In mounting batteries 50 at an automobile, since batteries 50 are relatively heavy, if mounting the batteries 50 at a high position in the top-bottom direction, the center of gravity of the automobile will become higher and the steering stability will be obstructed. In the present embodiment, the batteries 50 are fastened at the bottom side of the body floor 110. Therefore, the center of gravity position of the automobile becomes lower and the steering stability is raised.

Furthermore, according to the present embodiment, the batteries 50 are directly fastened to the bottom side of the body floor 110 and are suspended from the body floor 110, so a battery box or other part for supporting the batteries 50 from the bottom side becomes unnecessary. Due to this, the number of parts is slashed and the manufacturing cost is decreased. Further, the load which is applied when the automobile is involved in a collision is concentrated at the floor cross members 14a to 14f, so the load paths of the load are consolidated. The design is simplified, so the design process can be slashed.

Figure 6:
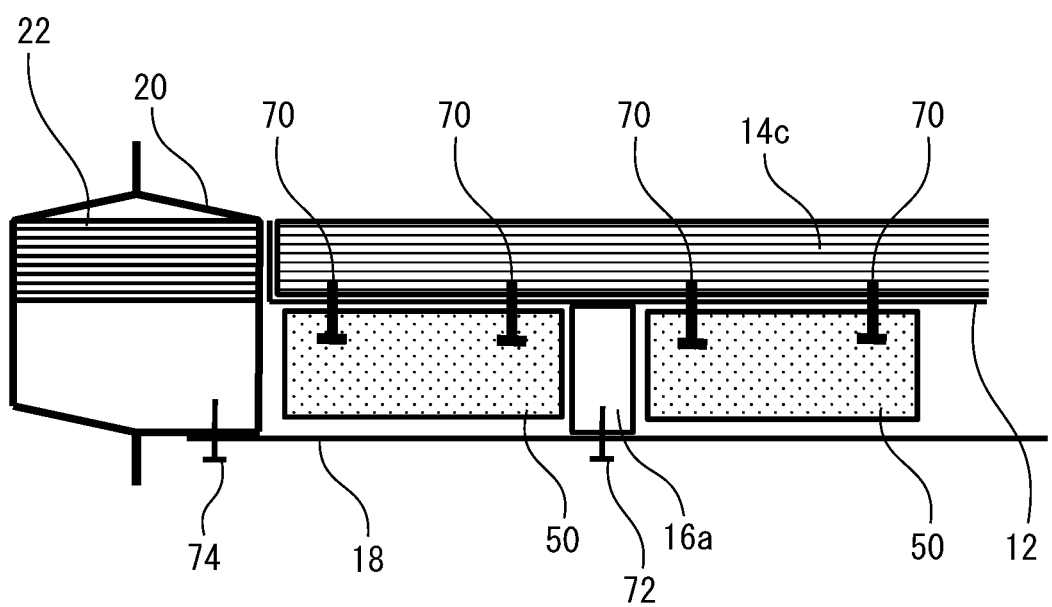
FIG. 6 is a schematic view showing enlarged a near side of a side sill in FIG. 4.

FIG. 6 is a schematic view showing enlarged a near side of a side sill 20 in FIG. 4. In FIG. 6, the example is shown where the floor cross member 14c is comprised of a square pipe. As shown in FIG. 6, the floor panel 12 may be bent upward into a cross-sectional L-shape at the position adjoining a side sill 20 and may be inserted between an end part of the floor cross member 14c and the side sill 20. The side sill 20, floor panel 12, and floor cross member 14c may be joined by welding etc. to form an integral assembly in the state with the floor panel 12 inserted between the side sill 20 and the floor cross member 14c. Note that the same is true for the joined portions of other floor cross members 14b, 14d, and 14e and the side sill 20. The under cover 18 may be fastened to the front side members 16a and 16b by fastening the bolts 72 in the front side members 16a and 16b. Further, the under cover 18 may be fastened to the side sill 20 by fastening the bolts 74 into the side sill 20.

The batteries 50 may be fastened by bolts 70 to the floor panel 12 or floor cross member 14c. Specifically, the batteries 50 may be provided with bolt insertion holes 52 for insertion of bolts 70. Further, the floor panel 12 or floor cross members 14 may be provided with screw holes into which the bolts 70 may be fastened. The batteries 50 may be fastened to the floor panel 12 or floor cross member 14c by insertion of bolts 70 from the bottom side into the bolt insertion holes 52 and fastening of the bolts 70 into the screw holes of the floor panel 12 or floor cross member 14c.

Note that, in FIG. 6, a cross-section at the position of the floor cross member 14c is shown, but the batteries 50 are fastened in the same way as FIG. 6 at the positions of the other floor cross members 14b, 14d, and 14e as well.

Figure 7:
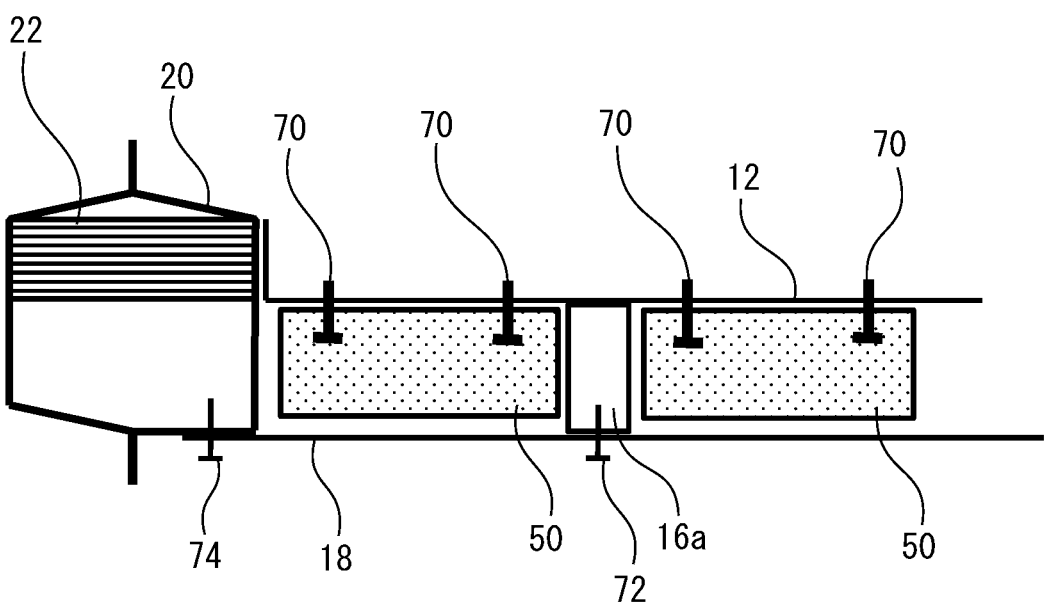
FIG. 7 is a schematic view showing enlarged a near side of a side sill in FIG. 5.

FIG. 7 is a schematic view showing enlarged a near side of a side sill 20 in FIG. 5. At the position of the cross-section shown in FIG. 5, there is no floor cross member above the battery 50. For this reason, the battery 50 may be fastened by bolts 70 to the floor panel 12. The floor panel 12 may be provided with screw holes into which the bolts 70 are fastened. The battery 50 may be fastened to the floor panel 12 by bolts 70 being inserted into the bolt insertion holes 52 from the bottom side and the bolts 70 being fastened in the screw holes of the floor panel 12.

Note that, if the floor panel 12 or floor cross members 14b to 14e are small in sheet thickness, instead of providing the floor panel 12 or floor cross members 14b to 14e with screw holes, it is also possible to fasten nuts having screw holes at the floor panel 12 or floor cross members 14 by welding etc. In this case, the bolts 70 fastening the batteries 50 are fastened into the nuts fastened to the floor panel 12 or floor cross members 14 so as to fasten the batteries 50. Note that, in the present embodiment, the later explained battery box can be eliminated, so even if making the sheet thicknesses of the floor panel 12 and the floor cross members 14b to 14e greater by exactly the elimination of the battery box, the vehicle weight will not increase. Therefore, the floor panel 12 and the floor cross members 14b to 14e can be made thicker to an extent enabling formation of screw holes.

If a running automobile collides with another vehicle or a stationary ground object etc., rapid deceleration will occur at the batteries 50 and the load occurring due to the deceleration (inertial force) will be applied to the batteries 50. Alternatively, if a stationary automobile is struck by another automobile, rapid acceleration will occur in the batteries 50 and the load occurring due to the acceleration (inertial force) will be applied to the batteries 50. Whatever the case, even if the generated load (inertial force) is applied to the batteries 50, according to the above such configuration, the body floor 110 has a high rigidity due to the side sills 20 and front side members 16a and 16b extending in the front-rear direction and the front cross members 14a to 14f extending in the left-right direction. In particular, the rigidity is raised with respect to impact from the side surface by the floor cross members 14a to 14f while the rigidity is raised with respect to impact from the front surface by the front side members 16a and 16b. Since the batteries 50 are directly fastened to the high rigidity body floor 110, the load (inertial force) at the time of deceleration or at the time of acceleration is directly transferred to the body floor 110 having the high rigidity. In particular, by fastening the batteries 50 in the state with their top surfaces abutting against the bottom surface of the floor panel 12, due to the frictional force generated between the top surfaces of the batteries 50 and the bottom surface of the floor panel 12 and/or the shear force of the bolts or other detachable fastening mechanisms used for fastening them (if not using detachable fastening mechanisms, rivets, welded parts or bonded parts), the load at the time of deceleration or at the time of acceleration is directly and reliably transferred to the body floor 110 having the high rigidity. Due to this, the support function of the batteries 50 is raised.

Figure 8:
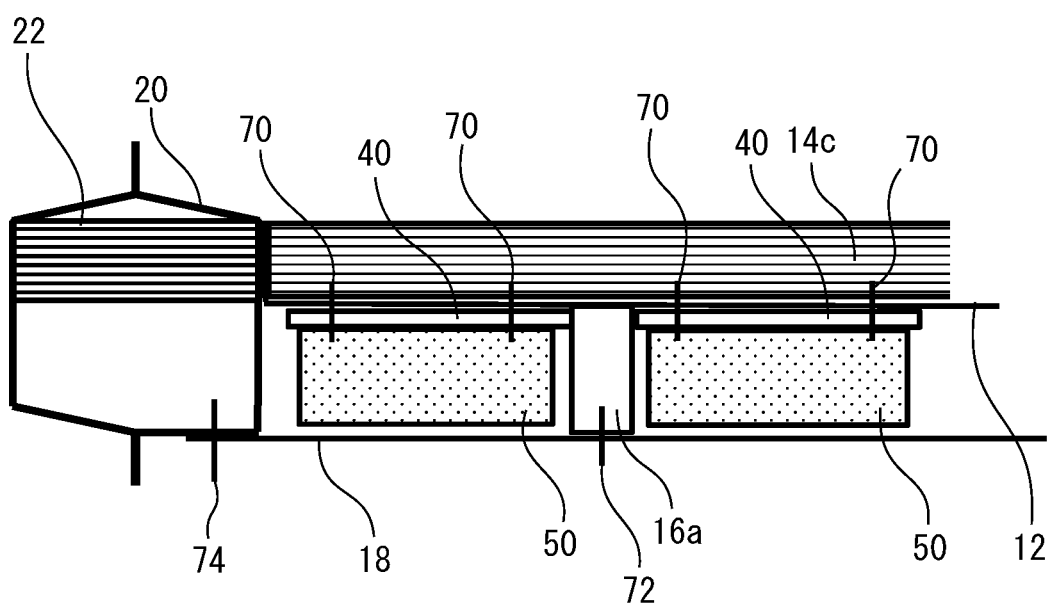
FIG. 8 is a view showing enlarged a near side of a side sill 20 and a schematic view showing an example of a water cooling panel arranged between a battery and floor panel.

FIG. 8 is a view showing enlarged a near side of a side sill 20 and a schematic view showing an example of water cooling panels 40 arranged between the batteries 50 and floor panel 12. FIG. 8, like FIG. 6, shows a cross-section along the direction of extension of the floor cross member 14c. The water cooling panels 40 are, for example, comprised of hollow structures of a thin box shapes inside of which a coolant circulates. The batteries 50 may be fastened by the bolts 70 to the floor panel 12 or a floor cross members 14 in a state with the water cooling panels 40 interposed between them and the floor panel 12.

Figure 9:
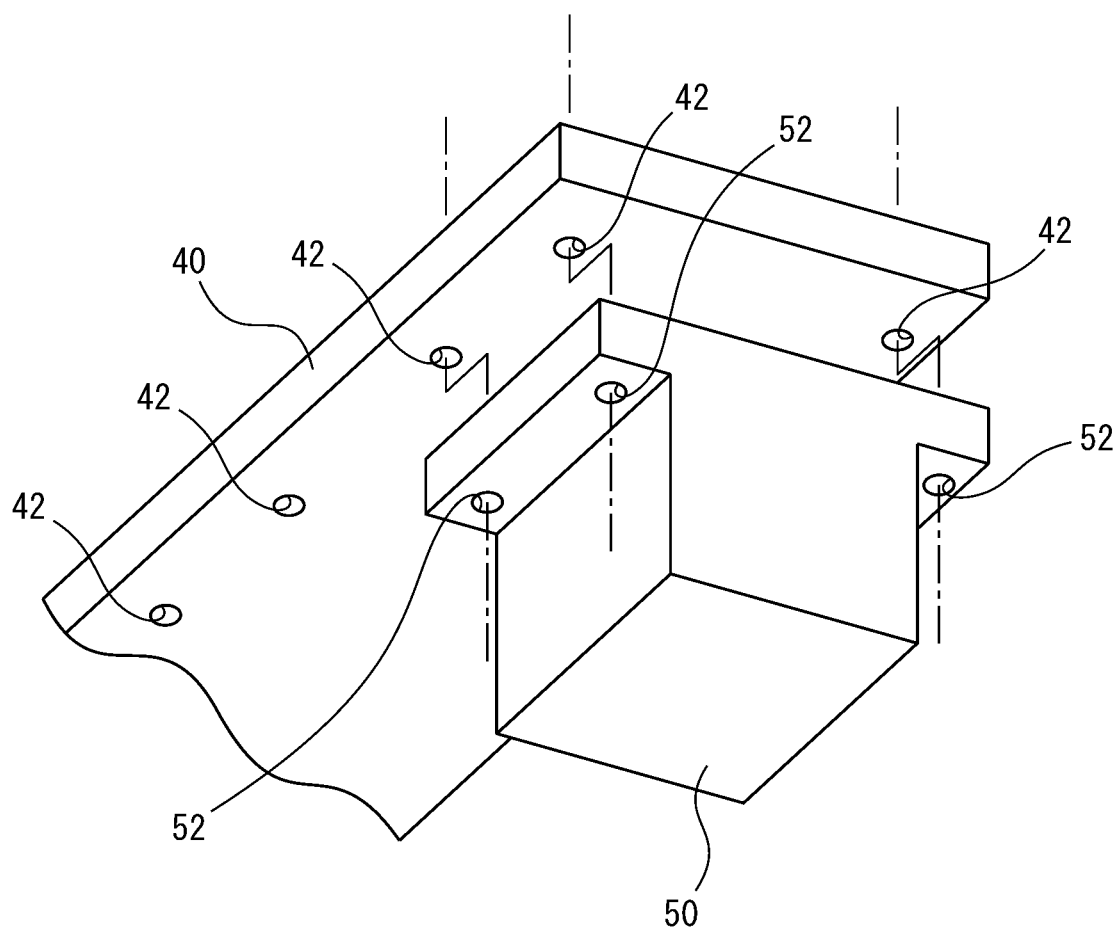
FIG. 9 is a perspective view showing a state of a battery and water cooling panel seen from a bottom side.

FIG. 9 is a perspective view showing a state of batteries 50 and water cooling panels 40 seen from a bottom side. As shown in FIG. 9, the batteries 50 are provided with bolt insertion holes 52 in which bolts 70 are inserted. Further, the water cooling panels 40 may be provided with bolt insertion holes 42 in which bolts 70 are inserted.

The batteries 50 and the water cooling panels 40 may be fastened to the floor panel 12 or floor cross members 14b to 14e by so-called joint fastening by insertion of bolts 70 from the bottom side into the bolt insertion holes 52 and 42 and fastening of the bolts 70 into the screw holes of the floor panel 12 or floor cross members 14b to 14e.

If the batteries 50 are battery cells, the battery cells are fastened to the floor panel 12 or floor cross members 14b to 14e by the housings of the battery cells in which electrolyte is contained being provided with bolt insertion holes 52 and the bolts 70 being fastened into the screw holes of the floor panel 12 or floor cross members 14b to 14e. Further, even if the batteries 50 are battery modules, the battery modules may be fastened to the floor panel 12 or floor cross members 14b to 14e by the housings of the battery cells being provided with bolt insertion holes 52 and the bolts 70 being fastened into the screw holes of the floor panel 12 or floor cross members 14b to 14e.

Further, if the batteries 50 are battery modules, the frame-shaped parts bundling the battery cells together are provided with bolt insertion holes 52. The battery modules may be fastened to the floor panel 12 or floor cross members 14b to 14e by bolts 70 being fastened in the screw holes of the floor panel 12 or floor cross members 14b to 14e. Further, in this case, the individual battery cells may be fastened to top surface of the frame-shaped parts connecting the battery cells together.

The electrodes of the batteries 50 may be provided on the top surfaces of the batteries 50 or may be provided on the bottom surfaces or side surfaces. If the electrodes are provided on the top surfaces of the batteries 50, the floor panel 12 or the floor cross members 14b to 14e are machined with a relief process etc. so as to avoid interference with the electrodes.

The batteries 50 discharge to supply electric power to the automobile. Further, the batteries 50 store electric power generated by a motor-generator provided in the automobile or electric power supplied from the outside. The batteries 50 generates heat in the process of discharge or charging. The heat generated due to heat generation by the batteries 50 moves in the upward direction of the batteries 50. Therefore, by arranging the water cooling panels 40 above the batteries 50, it is possible to effectively cool the batteries 50. Due to this, it becomes possible to extend the lifetime of the batteries 50.

In particular, when the batteries 50 are being rapidly charged, the amount of heat generated by the batteries 50 becomes greater. By arranging the water cooling panels 40 above the batteries 50, it is possible to reliably keep down the rise of temperature of the batteries 50 even at the time of rapid charging.

Figure 10:
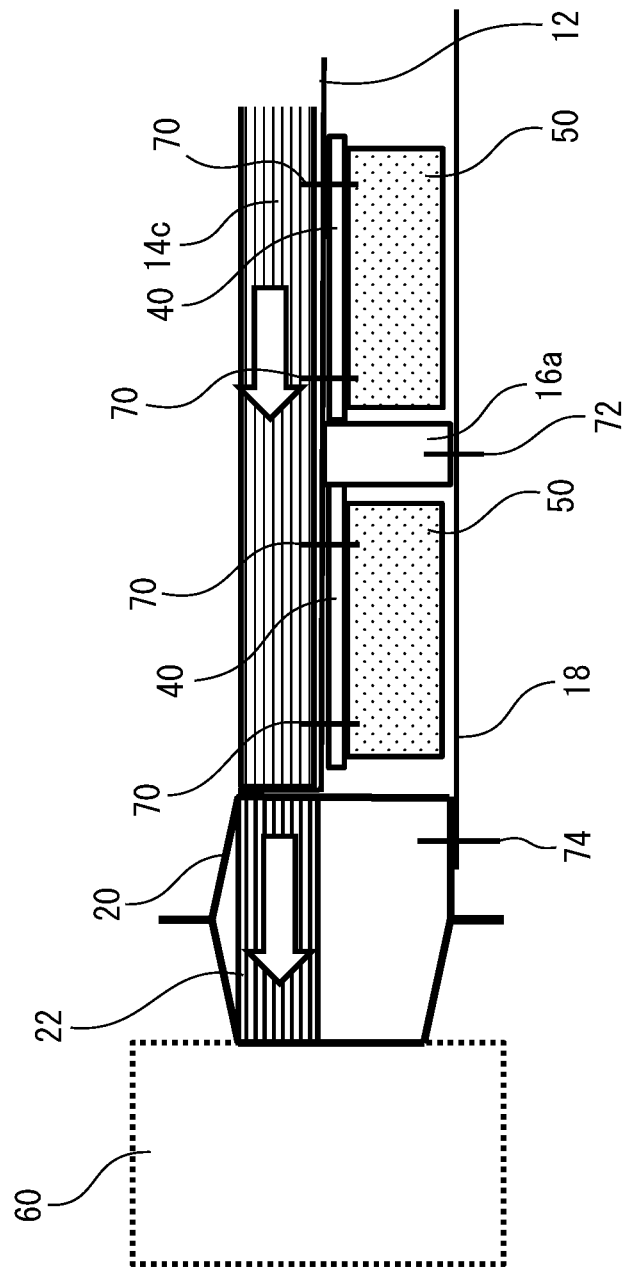
FIG. 10 explains the state where load paths of loads are decreased by the under body structure of the present embodiment.

Next, based on FIG. 10 to FIG. 12, the state where the load paths when a load (inertial force) is transferred at the time of a collision are consolidated by the under body structure 100 of the present embodiment will be explained. In FIG. 10, in the configuration shown in FIG. 8, the directions in which a load acts if a side surface of the automobile (side sill 20) collides with a pole 60 simulating a telephone pole are shown by white arrows.

FIG. 10 shows a side surface collision (side collision) of an automobile. It shows the state where the body floor 110 moves from the right to the left in the figure and a side sill 20 of body floor 110 collides with the pole 60.

If a side sill 20 hits a pole 60, rapid deceleration occurs in the components of the automobile including the body floor 110 which moved from the right to the left in the figure (for example, a seat etc. fastened to the floor panel 12). The load generated by the deceleration (inertial force) is transferred in the direction shown by the white arrows in FIG. 10. The load applied to the batteries 50 due to deceleration of the batteries 50 is transferred through the bolts 70 and floor panel 12 to the floor cross members 14b to 14e. The floor cross members 14b to 14e are fastened to the side sills 20, so the load transmitted to the floor cross members 14b to 14e is transferred to the side sills 20. Further, the energy absorbing members 22 built into the side sills 20 absorb the load.

Figure 11:
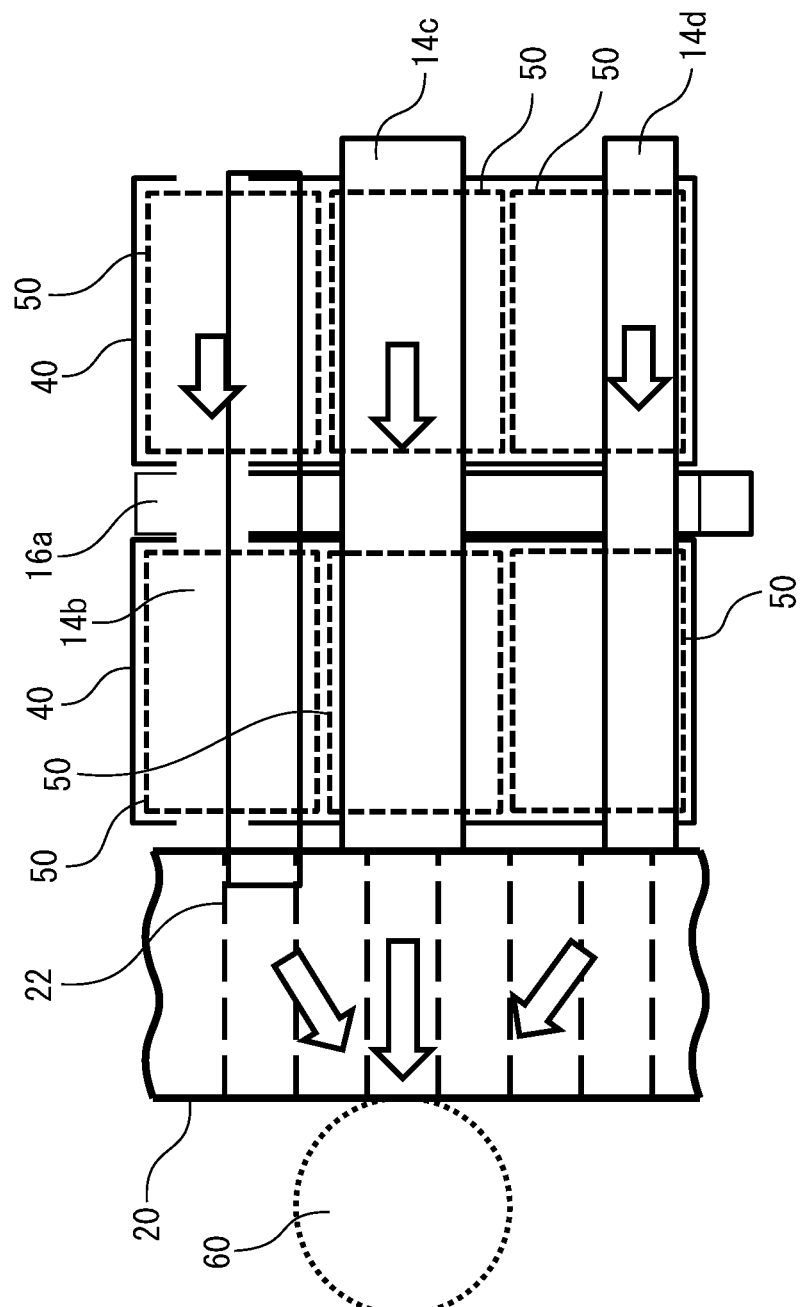
FIG. 11 explains the state where load paths of loads are decreased by the under body structure of the present embodiment.

FIG. 11 is a plan view showing the state when viewing the body floor 110 from above in FIG. 10. Note that, in FIG. 11, illustration of the floor panel 12 is omitted. In the plan view shown in FIG. 11, the load due to a collision is, as shown by the white arrows, transferred through the floor cross members 14b, 14c, and 14d and transmitted to the side sills 20.

As explained above, the energy absorbing members 22 are comprised of aluminum extruded materials etc. and are arranged inside the side sills 20 so that the extrusion directions match the longitudinal directions of the floor cross members 14a to 14f. As one example, the energy absorbing members 22 have hollow structures and are made rectangular in shapes of cross-sections perpendicular to the longitudinal directions. For this reason, if a side sill 20 collides with the pole 60, the energy absorbing members 22 collapse and the energy of the impact is absorbed.

In the above way, according to the present embodiment, the load occurring due to the batteries 50 rapidly decelerating at the time of a collision is transferred from the floor cross members 14 to the side sills 20. Therefore, in the cross-sectional view shown in FIG. 10, there is a single path of transfer of the load (load path).

Figure 12:
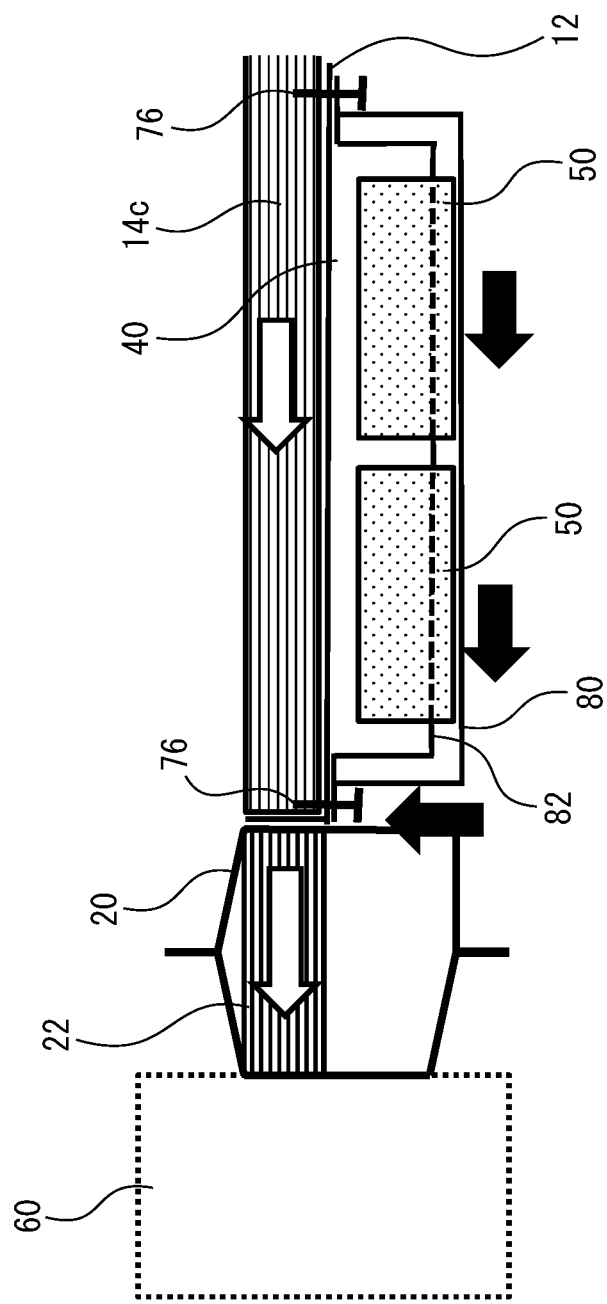
FIG. 12 explains the state where load paths of loads are decreased by the under body structure of the present embodiment.

FIG. 12 is a schematic view showing enlarged a near side of a side sill 20 in a structure of a comparative example placing and fastening the batteries 50 on a battery box 80 and fastening the battery box 80 to the floor panel 12 for comparison with FIG. 10.

In the structure shown in FIG. 12, the batteries 50 are placed and fastened at the bottom surface part of the battery box 80. The battery box 80 becomes a complicated structure from the viewpoint of supporting the weight of the batteries 50 and collision safety.

The battery box 80 is made a structure with a high rigidity in order to withstand a load due to a collision. The battery box 80 has cross members 82 for reinforcing rigidity from the bottom surface to the side surface at the inside. The cross members 82 are arranged so as to extend in the same directions as the floor cross members and are comprised of separate members of hollow structures, ribs, etc. The reason for providing such cross members 82 is that if not providing cross members 82, when a load is applied to the batteries 50 due to collision, the battery box 80 will deform and the battery box 80 may detach from the body floor together with the batteries 50.

Therefore, in the structure shown in FIG. 12, the battery box 80 is made a structure with a high rigidity equal to the body floor. In such a structure, if a side sill 20 collides with the pole 60, in the cross-sectional view shown in FIG. 12, there will be two systems of paths for transfer of the load (load paths). That is, if a side sill 20 collides with the pole 60, rapid deceleration will occur in the components of the automobile including the body floor 110 which had moved from right to left in the figure. The load generated due to the deceleration is transferred along the longitudinal directions of the floor cross members 14b to 14e in the direction shown by the white arrows in FIG. 12.

Further, the load applied to the batteries 50 due to deceleration of the batteries 50 is transferred through the cross members 82 provided from the bottom surface to the side surfaces of the battery box 80 and transmitted to the floor cross members 14b to 14e. Therefore, the load applied to the batteries 50 due to deceleration of the batteries 50 is transferred in the directions shown by the black arrows in FIG. 12.

In the above way, in the structure shown in FIG. 12, there are two load paths: the load path shown by the white arrows and the load path shown by the black arrows, so it is necessary to secure enough rigidity to be able to withstand a load at the time of a collision at both of the load paths. In other words, in the structure shown in FIG. 12, both the floor cross members and battery box have the same functions so the functions are wasted.

For example, when forming the battery box 80 and the floor cross members by steel materials, in the structure such as shown in FIG. 12, to secure the rigidity required at both of the battery box 80 and the floor cross members, the amount of use of structural materials increases and an increase in weight of the automobile is invited.

On the other hand, according to the present embodiment, the load paths are consolidated into only the single system shown by the white arrows in FIG. 10. This load path is the main path for transfer of load stopping the automobile when colliding with the pole 60 and is a path on the body floor 110 raised in rigidity by the floor cross members 14a to 14f, front side members 16a and 16b, and other members. The load due to deceleration of the batteries 50 is directly transferred to the rugged body floor 110, so a battery box 80 such as the structure shown in FIG. 12 is unnecessary. Note that, here, the explanation was given with reference to the example of a side surface collision of an automobile, but even if an automobile collides at the front surface, the load will be transferred in the longitudinal directions of the front side members 16a and 16b, so the load paths can be consolidated into one.

Therefore, in the present embodiment, the body floor 110 need only have the necessary rigidity. A battery box itself becomes unnecessary. Due to this, it is possible to eliminate a structure of transferring a load to the inside of a battery box 80 and combine the structure by which the load of batteries 50 is transferred at the time of collision with the rugged body floor 110.

In particular, if using high strength steel to reduce the sheet thickness of the steel materials and lighten the weight, the load at the time of collision will cause the floor cross members and other members to elastically buckle without plastic deformation. To delay elastic buckling at the time of collision as much as possible and raise the impact absorption ability, it is advantageous that the cross-sectional area of the cross-section in the direction perpendicular to the longitudinal directions of these cross members be small and sheets be thicker. By consolidating the load paths divided into two as shown in FIG. 12 into a single one as shown in FIG. 10, it is possible to make the cross-sectional area in the horizontal cross-section smaller and increase the sheet thickness without making the overall weight increase. Therefore, according to the present embodiment, compared with a structure such as shown in FIG. 12, it becomes possible to delay the elastic buckling at the time of collision and thereby improve the impact absorption ability and, further, becomes possible to slash the amount of use of structural materials and achieve lighter weight and possible to reduce manufacturing costs.

Further, according to the present embodiment, as shown in FIG. 2, batteries 50 are fastened over the entire surface of the body floor 110, so the effect also can arise of a decrease of transmitted sound, which is bottlenecked by mass. In other words, the heavier the weight of the under body structure 100, the more the sound transmitted from outside the automobile is decreased. Therefore, there is no need to provide asphalt sheets or other separate members for decreasing the transmitted sound. By eliminating these separate members, the weight can be decreased.

EXAMPLES

Figure 13:
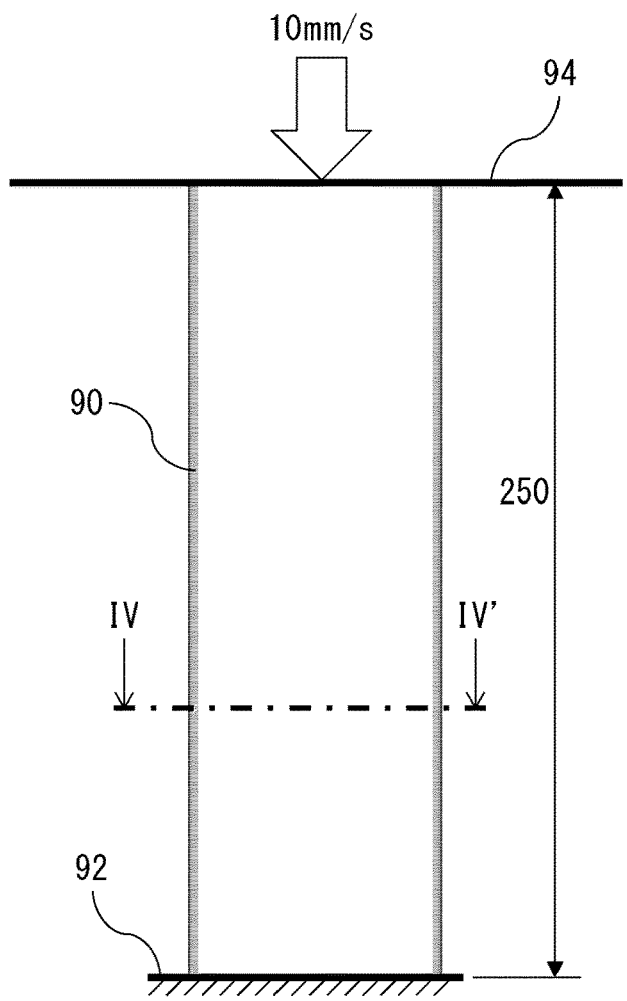
FIG. 13 is a side view showing a hollow member used when comparing the load resistance performances.
Figure 14:
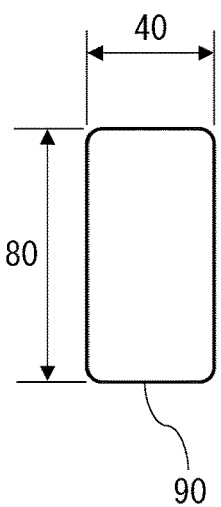
FIG. 14 is a schematic view showing a cross-section along a one-dot chain line IV-IV' of FIG. 13.

Below, the results of a comparison by simulation of the load resistance performance of an example consolidating the load paths into one such as in FIG. 10 and a comparative example where the load paths are divided into two such as in FIG. 12 will be explained. FIG. 13 is a side view showing a hollow member 90 used when comparing the load resistance performances. FIG. 14 is a schematic view showing a cross-section along a one-dot chain line IV-IV' of FIG. 13. The hollow member 90 corresponds to the floor cross member 14c shown in FIG. 10 and FIG. 12.

In the comparison of this load resistance performance, a hollow member 90 with a length in the longitudinal direction of 250 mm and a long side of 80 mm and a short side of 40 mm in a cross-section of the rectangular shape shown in FIG. 14 was used. Further, as shown in FIG. 13, the hollow member 90 was arranged so that its longitudinal direction became the gravity direction, one end face in the longitudinal direction was made to abut against the floor 92, and the other end face was subjected to a load by a plate-shaped impacter 94 downward in the gravity direction at a speed of 10 mm/s. The weight efficiency of the load resistance of the hollow member 90 with respect to displacement of the impacter 94 at that time was calculated to compare the load resistance performances.

In the example consolidating the load paths into one, a single hollow member 90 comprised of a steel sheet with a yield strength of the 1470 MPa class and a thickness of 2.0 mm was used. On the other hand, in the comparative example in which the load paths were divided into two, two hollow members 90 comprised of steel sheets with a yield strength of the 1470 MPa class and a thickness of 1.0 mm were used in parallel.

Figure 15:
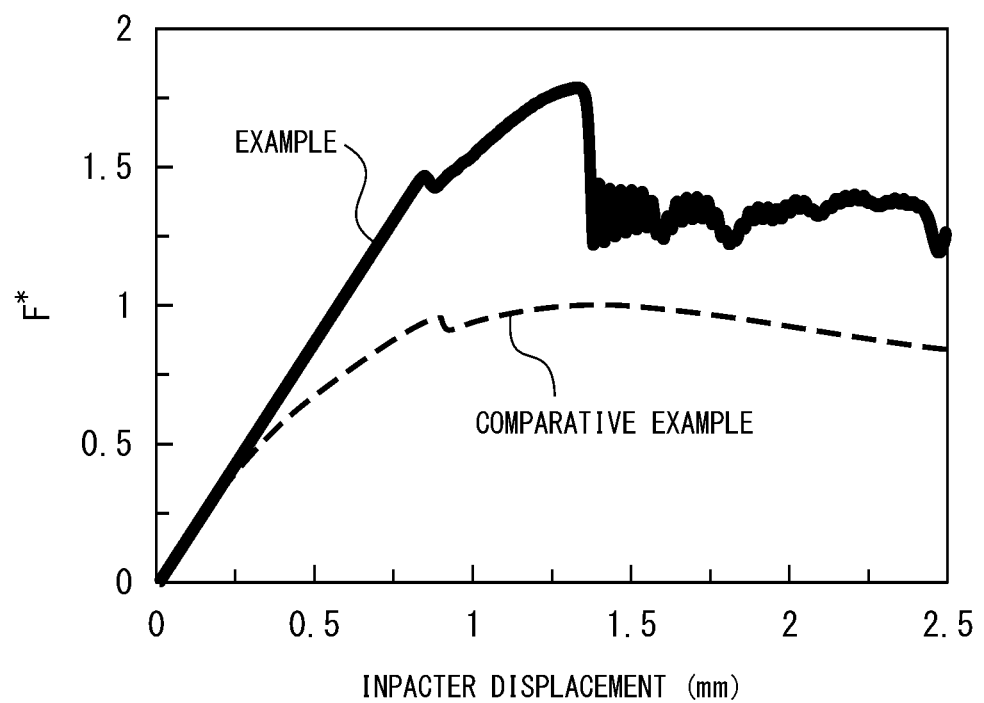
FIG. 15 is a graph showing the results of comparison of the load resistance performance of an example and comparative example.

FIG. 15 is a graph showing the results of comparison of the load resistance performance of the example and comparative example. In FIG. 15, the abscissa shows the displacement of the impacter 94. Further, in FIG. 15, F* of the ordinate is a value showing the load resistance by the weight efficiency. This shows the ratio of the (load applied to hollow member 90/member weight of hollow member 90) of the example or comparative example to the (maximum load applied to hollow member 90/member weight of hollow member 90) of the comparative example. As shown in FIG. 15, it will be understood that the example which consolidates the load paths into one and increases the thickness of the hollow member 90 can achieve both load resistance performance and lighter weight at higher levels compared with the comparative example dividing the load paths into two and decreasing the thickness.

As explained above, according to the present embodiment, the batteries 50 are directly fastened to the bottom side of the body floor 110 without using a battery box 80, so compared with when using a battery box 80, it is possible to decrease the number of load paths. As a result, it becomes possible to achieve both load resistance performance and lighter weight.

REFERENCE SIGNS LIST 12 floor panel
14a to 14f floor cross members
15 front bumper beam
16a, 16b front side members
17a, 17b rear side members
17c cross members
18 under cover
19 rear bumper beam
20 side sill
22 energy absorbing member
40 water cooling panel
42, 52 bolt insertion holes
50 battery
60 pole
70, 72, 74 bolts
90 hollow member
92 floor
94 impacter

The invention claimed is:

1. An under body structure of an automobile comprising a body floor forming a floor part of the automobile and a battery cell or a battery module;
wherein,
the battery cell or the battery module is directly suspended from and fastened to a bottom side of the body floor.

2. The under body structure of an automobile according to claim 1, wherein the battery cell or the battery module is fastened to the body floor in a state with top surface of the battery cell or the battery module abutting against a bottom surface of the body floor.

3. The under body structure of an automobile according to claim 1, further comprising a cooling panel in which a coolant circulates, the battery cell or the battery module being fastened to the body floor with the cooling panel interposed between the battery cell or the battery module and the body floor.

4. The under body structure of an automobile according to claim 3, wherein a top surface of the battery cell or the battery module abuts against a bottom surface of the cooling panel.

5. The under body structure of an automobile according to claim 1, wherein
the body floor has a floor panel forming a floor surface of the automobile and
the battery cell or the battery module is fastened to the floor panel.

6. The under body structure of an automobile according to claim 5, wherein
the body floor has cross members arranged on the floor panel and extending in a left-right direction of the automobile and
the battery cell or the battery module is fastened to the floor panel or the cross members.

7. The under body structure of an automobile according to claim 5, wherein
the body floor has side sills extending in a front-rear direction of the automobile at outermost parts in a left-right direction of the automobile,
the floor panel is provided between left and right side sills, and
the battery cell or the battery module is arranged over the entire area of the floor panel including regions adjoining the side sills.

* * * * *